July 4, 1939.                    E. M. BERNDT                    2,164,375
                              FILM GUIDING MEANS
            Filed Oct. 27, 1938                    2 Sheets-Sheet 1
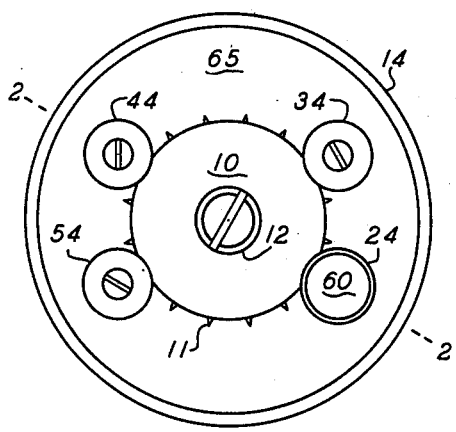
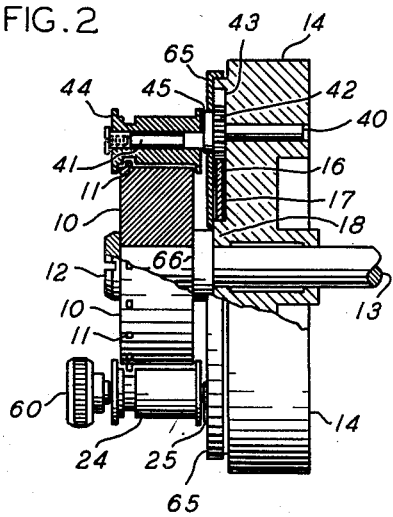
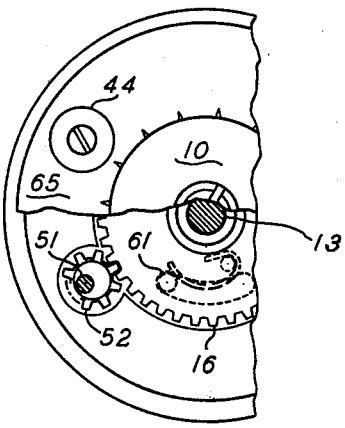
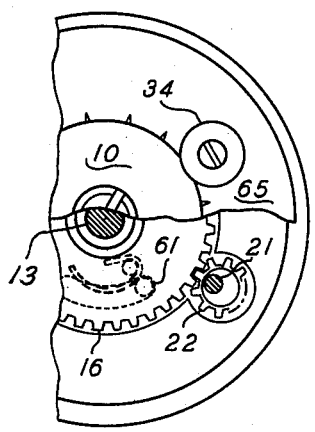
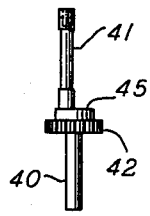
Erich Berndt
INVENTOR July 4, 1939.  E. M. BERNDT  2,164,375
FILM GUIDING MEANS
Filed Oct. 27, 1938  2 Sheets-Sheet 2

Eric M. Berndt
INVENTOR

Patented July 4, 1939

2,164,375

UNITED STATES PATENT OFFICE 2,164,375

FILM GUIDING MEANS

Eric M. Berndt, New York, N. Y., assignor to The Berndt-Maurer Corp., New York, N. Y., a corporation of New York Application October 27, 1938, Serial No. 237,296

19 Claims. (Cl. 271—2.3)

This invention relates to means whereby film is guided around a sprocket wheel or the like in film-handling apparatus, for example, in motion picture cameras and projectors, and sound recorders and reproducers. This sprocket serves to propel the film through the apparatus, and for that purpose it usually has spaced teeth which engage the film perforations for the advancement of the film. In most cases it is desirable to propel the film by a sprocket on both sides of the working parts of the apparatus, for example, to advance it positively both before and after it passes the shutter and pull-down mechanism in a motion picture camera. Separate sprockets may be employed for each position, but it is frequently more convenient to employ the same sprocket for both purposes, so that the film passes about one side of the sprocket as it is fed in, and about the other side of the sprocket as it is taken up. In either case, means must be provided for guiding the film around the sprocket and for keeping it in engagement with the sprocket teeth. These film guiding means commonly consist of a plurality of individual film guiding members, for example, of idler rollers, having a surface configuration such that they may be placed into close proximity with the sprocket.

An object of the invention is to provide improved, simplified, and reliable means whereby film may be guided effectively around a sprocket, and whereby the individual film guiding members may be opened or closed with respect to the sprocket for insertion or removal of the film.

In the design and manufacture of such film guiding means the following requirements have chiefly to be taken into consideration: In the first place, the individual film guiding member must be supported in such a manner that it is rigidly held in the correct position and has sufficient mechanical strength to resist deformation if, for example, a film jam occurs in the apparatus and film winds around the sprocket. Furthermore, the means supporting the film guiding members must not occupy space which is needed for other uses in the apparatus. Moreover, the distance between the sprocket surface and the film guiding members when they are in the closed position must be controlled accurately. If this space is too small the film will be scratched; if it is too large the film may escape from the sprocket teeth. Finally, all of the film guiding members must be displaced in the proper order or so that they have all been opened or closed at a given stage of the threading operation, and, in some instances, it is advantageous for them to be displaced all at the same time because this facilitates rapid threading of the apparatus.

It is, therefore, another object of the invention to provide film guiding means which meet these requirements in a better, more dependable, and generally more satisfactory manner than devices known heretofore; and a still further object is to provide improved film guiding means that is relatively inexpensive to manufacture, especially convenient to manipulate, and not likely to get out of order. Other objects and advantages include those which are hereinafter stated or apparent or which are incidental to the invention.

The invention will be better understood when the following description is considered with the accompanying drawings of certain presently preferred embodiments thereof set forth by way of example, and its scope will be pointed out in the appended claims.

In the drawings:

Fig. 1 is a front elevation of a device embodying the invention.

Fig. 2 is partly a side elevation thereof, and partly a section on line 2—2 of Fig. 1.

Fig. 4 is a side elevation of a part shown in Fig. 2.

Figs. 5a and 5b are combinations of parts of the views shown in Figs. 1 and 3, showing certain elements in different working positions.

Figure 3:
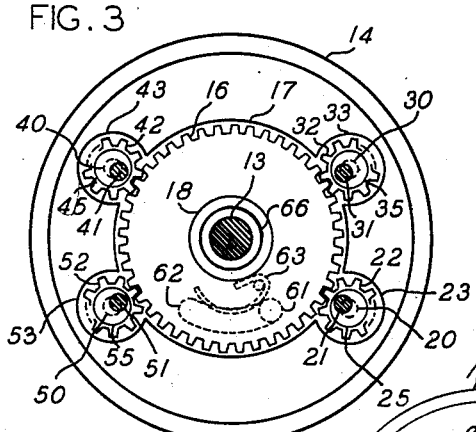
Fig. 3 is another front elevation of the device, after a sprocket, four idler rollers, and a cover plate, shown in Fig. 1, have been removed; certain shafts employed therein shown in cross section.

Referring to Figs. 1 and 2, the device includes a sprocket 10 which has the usual teeth 11, and which is locked by a screw 12 to a shaft 13 rotatably supported in a base 14 behind sprocket 10. Whereas in the example illustrated only one row of sprocket teeth is shown, as for 16 mm. sound film having perforations on only one side, the device can be made also with other sprocket arrangements, such as a sprocket having two rows of teeth for film which is perforated at both sides. At that side of base 14 which is away from sprocket 10, a gear (not shown) may be keyed to shaft 13 so that sprocket 10 may be rotated by the motor or other actuating mechanism of the film-handling apparatus.

A gear 16 (Figs. 2 and 3) is rotatably supported by that side of base 14 which faces sprocket 10, and is in concentric relation to but not in driving connection with sprocket 10 and shaft 13. In the device shown, gear 16 is advantageously placed in a recess 17 of base 14 and has its bearing on a bushing portion 18 thereof which surrounds shaft 13, so as to obviate any possibility of gear 16 being accidentally turned by the rotation of shaft 13.

Rotatably mounted in base 14 and adjacent to sprocket 10 at positions where it is desired to have film guiding members are a plurality of shafts (Figs. 2 to 4); although four such shafts are shown, more or less may be employed in accordance with the number of film guiding members required. Each shaft has a lower portion 20, 30, 40, and 50, respectively, which is journalled in base 14 as shown in Fig. 2, and an upper portion 21, 31, 41, and 51, respectively, which is eccentric with respect to the axis of its lower portion. Gears 22, 32, 42, and 52, are mounted on the lower portions and concentric with the axes thereof. These gears may be made integral with their shafts if desired, and they are so placed with respect to base 14 that they mesh with gear 16, for example, by providing for them recesses 23, 33, 43, and 53, respectively, in base 14, which are of the same depth as recess 17.

Each of the eccentric portions 21, 31, 41, and 51, rotatably carries a suitable film guiding member, for example, an idler roller 24, 34, 44, and 54, respectively, of suitable configuration to cooperate with sprocket 10 in guiding film around it, and one of them, for example, eccentric portion 21, extends beyond its idler roller, away from sprocket 10, and has secured to it a thumb knob 60 or like means for turning it by hand (Figs. 1 and 2). To insure free rotation of the idler rollers, locating steps 25, 35, 45, and 55, may be provided between gears 22, 32, 42, and 52, and eccentric portions 21, 31, 41, and 51, respectively.

Gear 16 carries, preferably at a peripheral point, a pin 61 which extends rearwardly into and through a curved slot 62 in base 14 (Fig. 3). On the opposite side of base 14, there is mounted a spring 63 which resiliently bears upon pin 61 and is so placed, for example, as shown in Fig. 3, as to bias pin 61 toward and hold it firmly at either end of slot 62 against accidental rotation of gear 16.

To protect gears 16, 22, 32, 42, and 52, and hold them in place, a cover plate 65 (Figs. 1 and 2), fitting against base 14, may be placed between these gears and sprocket 10, and the idler rollers. It may have suitable apertures to pass a retaining collar 66 on shaft 13 (Figs. 2 and 3), and locating steps 25, 35, 45, and 55.

In Figs. 2 and 3, the eccentric portions are shown as all turned toward sprocket 10. In this position of the eccentric portions, the idler rollers are closed with respect to sprocket 10 as shown in Figs. 1 and 2. If now it is desired to open them in order to thread film, for example, between idler rollers 44 and 54, and sprocket 10 on the feed side, and between idler rollers 24 and 34, and sprocket 10 on the take-up side of the film-handling apparatus, all that is necessary to do is to turn thumb knob 60 in a counterclockwise direction. Upon such turning of thumb knob 60, eccentric portion 21 and gear 22 will be rotated also in a counterclockwise direction, and gear 16, in mesh with gear 22, will be rotated in a clockwise direction, until pin 61 on gear 16 is arrested at the left-hand end of slot 62 (Figs. 3 and 5); the length of slot 62 being conveniently so chosen that pin 61 is arrested after one-half revolution of thumb knob 60. Thereby the whole movement is stopped, and eccentric portion 21 has been rotated away from sprocket 10 so as to open idler roller 24 with respect to it. At the same time, gear 16, being rotated in a clockwise direction and in mesh with gears 32, 42, and 52, has rotated each of these gears in a counterclockwise direction and, as they are of the same size as gear 22, to the same extent as this gear was rotated by turning thumb knob 60. This rotation of gears 32, 42, and 52, has turned eccentric portions 31, 41, and 51, and, consequently, idler rollers 34, 44, and 54, to the opened position, away from sprocket 10.

Thus, all of the idler rollers have been opened simultaneously by the single and simple operation of turning thumb knob 60. Correspondingly, in order to close the idler rollers around sprocket 10 thumb knob 60 merely need be turned in a clockwise direction until pin 61 is again arrested at the right-hand end of slot 62 (Figs. 3 and 5), whereby the idler rollers are moved back into their initial position. Both in the closed and opened positions, the idler rollers are locked by the pressure of spring 63 against pin 61 at the right-hand and left-hand ends of slot 62.

The relative positions of the eccentric portions with respect to gear 16, and of the idler rollers with respect to sprocket 10, when opened and closed, are shown in Figs. 5a and 5b. In Fig. 5a, eccentric portion 51 and idler roller 44 are in their opened positions away from gear 16 and sprocket 10, whereas in Fig. 5b, eccentric portion 21 and idler roller 34 are in their closed positions toward gear 16 and sprocket 10; the lower half of cover plate 65 being broken away and eccentric portions 21 and 51 and part of shaft 13 shown in cross section.

It is, however, sometimes desirable that certain groups of film guiding members may be opened and closed independently of each other, for example, those of the feed side independently of those of the take-up side. Several modifications for achieving that end are shown, by way of example, in Figs. 6 to 10. The constructions shown there are essentially the same as that shown in Figs. 1 to 5b, and the deviations from this construction are to be made chiefly in the plane of the gearing 16, 22, 32, 42, and 52, thereof. Hence, in Figs. 6 to 9, there are shown only views which correspond to the view shown in Fig. 3 (sprocket, idler rollers, and cover plate being removed and the shafts shown in cross section), whereas Fig. 10 explains a locking arrangement which may be used in connection with the constructions of Figs. 7 to 9; parts which are identical in all the constructions being indicated by the same numerals.

Figure 6:
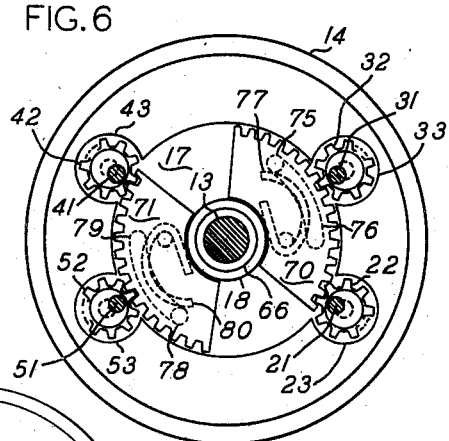
Fig. 6 is a modification of Fig. 3.

Thus it will be seen that the view shown in Fig. 6 differs from that of Fig. 3 only in that gear 16 is replaced by two gear segments 70 and 71, and that, consequently, instead of the locking arrangement 61 to 63 two similar spring locks 75 to 77, and 78 to 80, are provided. Gear segments 70 and 71 are movable in recess 17 around bushing 18 and hence in concentric relation to, but not in driving connection with, sprocket 10 and shaft 13, and they may be held in place by cover plate 65 (not shown); gear segment 70 meshing with gears 22 and 32, and gear segment 71 meshing with gears 42 and 52. Either eccentric portion 21 or eccentric portion 31, and either eccentric portion 41 or eccentric portion 51 may extend beyond their respective idler rollers, and may have secured to them means for turning them by hand, for example, thumb knobs like thumb knob 60 shown in Figs. 1 and 2. The spring locks 75 to 77, and 78 to 80, work in the same manner as the spring lock 61 to 63 shown in Figs. 3 and 5, and the method of operation for opening and closing each group of idler rollers, rotatably carried by eccentric portions 21 and 31, and eccentric portions 41 and 51, respectively, is the same as has been explained above in connection with Fig. 5.

Figure 7:
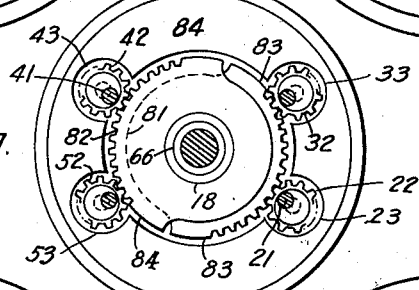
Fig. 7 is a modification of Fig. 6.

In Fig. 7, gear segments 70 and 71 of Fig. 6 are replaced by two mutilated gears 81 and 82; both having their bearing on bushing 18, and gear 82 being put on top of gear 81. The solid portions 83, 83, and 84, 84, of the peripheries of gears 81 and 82, respectively, prevent these gears from being turned in the wrong directions, and for locking the idler rollers in their opened and closed positions, there may be used the arrangement shown in Fig. 10, which will be explained hereinafter.

Figure 8:
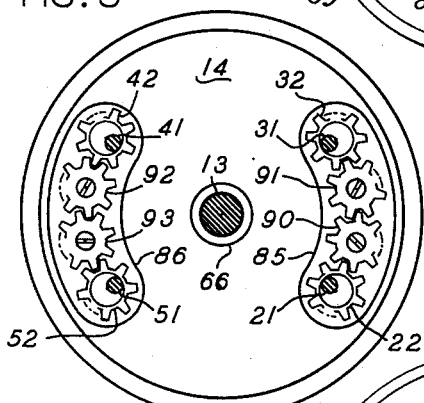
Figs. 8 and 9 are still other modifications of Fig. 3.

In Fig. 8, two trains of gears 90 and 91, and 92 and 93, respectively, are mounted for rotation on base 14; gears 90 and 91 being in mesh with gears 22 and 32, respectively, and gears 92 and 93 with gears 42 and 52, respectively. Assuming that eccentric portions 21 and 41 are provided with thumb knobs or like means by which they can be turned in either direction, torque will be transmitted by gears 90 and 91 from gear 22 to gear 32, and by gears 92 and 93 from gear 42 to gear 52. Gears 90 to 93 and gears 22, 32, 42, and 52, may be all the same size as shown, and two recesses 85 and 86 may be provided in base 14 to receive the two systems of gears 22, 90, 91 and 32, and 42, 92, 93 and 52, respectively. But the number and size of the gears separately transmitting torque between gears 22 and 32, and 42 and 52, respectively, and the arrangement of these two trains of gears with respect to base 14 may be varied without departure from the spirit of the invention.

It is also possible to dispense with separate means for transmitting torque between the gear or gears turned by hand and the other gear or gears by making these gears large enough that they mesh directly. This is shown by way of example in Fig. 9, where on lower portions 20, 30, 40, and 50, there are mounted gears 28, 38, 48, and 58, respectively, which are larger than gears 22, 32, 42, and 52, used in the constructions previously shown and described. As gear 28 meshes with gear 38, and gear 48 with gear 58, either eccentric portion 21 or eccentric portion 31, and either eccentric portion 41 or eccentric portion 51 may be provided with suitable means for turning them by hand. Gears 28 and 38, and gears 48 and 58 may be placed in suitably shaped recesses 87 and 88, respectively, as shown in Fig. 9.

Figure 10:
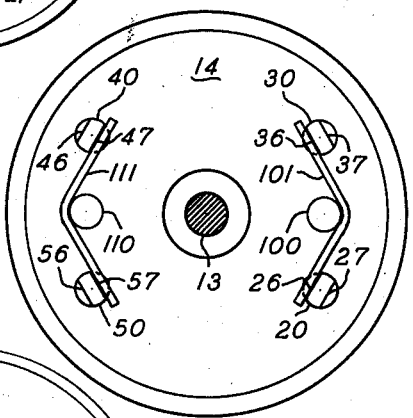
Fig. 10 is an end elevation of the devices shown in Figs. 7, 8, and 9.
Figure 9:
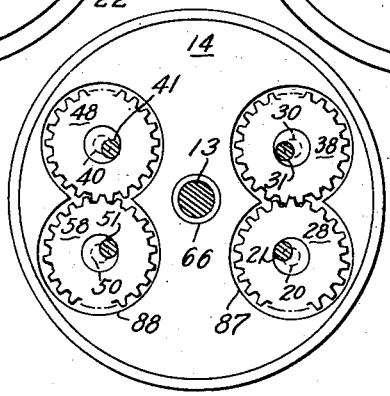

A suitable locking arrangement for the devices shown in Figs. 7 to 9 is illustrated, by way of example, in Fig. 10. On that side of base 14 which is away from sprocket 10, lower portions 20, 30, 40, and 50, protrude from their bearing holes, and studs 100 and 110 project from base 14 in the same direction. Springs 101 and 111 are sprung around studs 100 and 110 and press against lower portions 20 and 30, and 40 and 50, respectively. Flats 26 and 27, 36 and 37, 46 and 47, and 56 and 57, are cut on lower portions 20, 30, 40, and 50, respectively, to be engaged by springs 101 and 111 when the eccentric portions 21, 31, 41, and 51 (not shown in Fig. 10), are in their opened or closed positions, and thus locking the idler rollers in these positions.

It will now be understood that the invention meets the requirements stated above for film guiding means of the character described in a satisfactory manner. In the first place, a strong rigid support is provided for the idler rollers because the shafts as a whole (each consisting of its lower portion and its upper eccentric portion) can readily be made of such size as to have ample mechanical strength, and because those portions of base 14 in which lower portions 20, 30, 40, and 50, have their bearings may be relatively massive as shown in Fig. 2. Furthermore, the means for supporting and displacing the idler rollers are all directly back of them and sprocket 10. Thus, they are out of the film path entirely, and in a part of the film-handling apparatus where it is rarely necessary to place anything else, so that a considerable saving of space is accomplished. Moreover, the bearing holes in base 14 can be drilled in a drill jig, the amount of eccentricity of upper portions 21, 31, 41, and 51, is easily controlled, and the diameter of the idler rollers can be held within close limits. Therefore, the spacing between the idler rollers and the surface of sprocket 10 can be wholly predetermined in the design, and no adjustments are required after base 14, supporting the whole assembly of sprocket and film guiding means, has been mounted in the film-handling apparatus. It is indeed a particularly advantageous feature of the invention that the sprocket, the film guiding means, and the means for displacing the individual film guiding members with respect to the sprocket, are assembled as a single unit which can be easily inserted into the film-handling apparatus, or which can be removed therefrom for inspection and repair or for other purposes. Finally, all of the film guiding members or certain separate groups thereof are opened and closed simultaneously by a single and simple operation, and the stop arrangement is such that they all come to rest automatically in the correct positions.

Whereas in the examples shown and described the sprocket has film guiding members on both sides so as to serve for taking up the film as well as feeding it, film guiding members may be placed on only one side of the sprocket, if desired, without abandoning the advantages of the invention. In this case, either gear segment 70, mutilated gear 81, and gear train 90, 91, or gear segment 71, mutilated gear 82 and gear train 92, 93, may be omitted if the constructions shown in Figs. 6 to 8 are employed, while gear 16 of the construction shown in Fig. 3 may be used without alterations.

Many other ways of carrying out the invention will readily suggest themselves to those skilled in the art. The invention, therefore, is not to be limited, except in so far as is necessitated by the prior art and by the spirit of the appended claims.

What is claimed is:

1. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and means for transmitting torque between said gears.

2. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and means associated with certain separate groups of said gears for transmitting torque between the gears of each of said groups.

3. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and a gear meshing with said first mentioned gears.

4. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and a gear segment meshing with said gears.

5. In film handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and a mutilated gear meshing with said gears.

6. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and a plurality of gears; each of said second mentioned gears meshing with a separate group of said first mentioned gears.

7. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and a plurality of gear segments; each of said gear segments meshing with a separate group of said gears.

8. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and a plurality of mutilated gears; each of said mutilated gears meshing with a separate group of said gears.

9. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; and gears mounted on said lower portions; said gears being in mesh with each other.

10. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; and gears mounted on said lower portions; said gears being in mesh with each other by groups.

11. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and a rotatable gear in concentric relation to said sprocket and said first mentioned shaft and in mesh with said first mentioned gears.

12. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and a gear segment in concentric relation to said sprocket and said first mentioned shaft and in mesh with said gears.

13. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and a mutilated gear in concentric relation to said sprocket and said first mentioned shaft and in mesh with said gears.

14. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and two rotatable gear segments in concentric relation to said sprocket and said first mentioned shaft and each in mesh with a separate group of said gears.

15. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and two rotatable mutilated gears in concentric relation to said sprocket and said first mentioned shaft and each in mesh with a separate group of said gears.

16. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and a gear transmitting torque from one of said first mentioned gears to another of said first mentioned gears.

17. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and a train of gears transmitting torque from one of said first mentioned gears to another of said first mentioned gears.

18. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and two gears; each of said last mentioned gears transmitting torque from one of said first mentioned gears to another of said first mentioned gears.

19. In film-handling apparatus a base; a shaft rotatably supported in said base; a sprocket locked to said shaft; a plurality of shafts rotatably mounted in said base and adjacent to said sprocket; each of said plurality of shafts having a lower portion and an upper portion, said upper portion being eccentric with respect to the axis of said lower portion; film guiding members carried by said upper portions; gears mounted on said lower portions; and two trains of gears; each of said last mentioned trains of gears transmitting torque from one of said first mentioned gears to another of said first mentioned gears.

ERIC M. BERNDT.